(12) United States Patent
Rupin

(10) Patent No.: US 11,875,000 B2
(45) Date of Patent: Jan. 16, 2024

(54) HAPTIC FEEDBACK DEVICE PROVIDED WITH STIFFENERS

(71) Applicant: HAP2U, Saint Martin d'Hères (FR)

(72) Inventor: Matthieu Rupin, Saint Martin d'Hères (FR)

(73) Assignee: HAP2U, Saint Martin d'Hères (FR)

( * ) Notice: Subject to any disclaimer, the term of this patent is extended or adjusted under 35 U.S.C. 154(b) by 0 days.

(21) Appl. No.: 17/603,495

(22) PCT Filed: Apr. 25, 2020

(86) PCT No.: PCT/FR2020/000153
§ 371 (c)(1),
(2) Date: Oct. 13, 2021

(87) PCT Pub. No.: WO2020/217011
PCT Pub. Date: Oct. 29, 2020

(65) Prior Publication Data
US 2022/0179509 A1    Jun. 9, 2022

(30) Foreign Application Priority Data
Apr. 26, 2019 (FR) .................... 19 04447

(51) Int. Cl.
*G06F 3/043* (2006.01)
*G06F 3/01* (2006.01)
(Continued)

(52) U.S. Cl.
CPC .............. *G06F 3/043* (2013.01); *G06F 3/016* (2013.01); *G06F 3/0412* (2013.01); *H10K 59/00* (2023.02)

(58) Field of Classification Search
CPC ........ G06F 3/016; G06F 3/0412; G06F 3/043; G08B 6/00; H01L 27/3225
See application file for complete search history.

(56) References Cited

U.S. PATENT DOCUMENTS

| 8,416,027 B2 * | 4/2013 | Takizawa ............... H10N 30/88 310/370 |
| 8,593,409 B1 * | 11/2013 | Heubel ................. B06B 1/0629 340/407.1 |

(Continued)

FOREIGN PATENT DOCUMENTS

EP       3287880 A1    2/2018

OTHER PUBLICATIONS

International Search Report (PCT/ISA/210) with translation and Written Opinion (PCT/ISA/237) dated Aug. 26, 2020, by the European Patent Office as the International Searching Authority for International Application No. PCT/FR2020/000153.

*Primary Examiner* — Olga V Merkoulova
(74) *Attorney, Agent, or Firm* — BUCHANAN INGERSOLL & ROONEY PC

(57) ABSTRACT

The invention relates to a haptic feedback device comprising a support which can be vibrated and of which a first face is coated with at least one layer for detecting the position of a user's finger. The device includes electromechanical actuators which are aligned along an edge of the support or the layer and which are capable of making the support and the layer vibrate at an ultrasonic resonance frequency. The support comprises on the second face thereof a set of stiffeners distributed over the whole of said second face and configured to make it more difficult to bend the support along an axis perpendicular to the stiffeners, the stiffeners being designed to produce an axial and uniform vibration mode for the support, all the antinodes of which are of substantially equal amplitude.

13 Claims, 3 Drawing Sheets

(51) Int. Cl.
  *G06F 3/041* (2006.01)
  *H10K 59/00* (2023.01)

(56) References Cited

U.S. PATENT DOCUMENTS

| | | | | |
|---|---|---|---|---|
| 9,829,982 | B2* | 11/2017 | Bernstein | G06F 3/0416 |
| 10,120,450 | B2* | 11/2018 | Bernstein | G06F 3/0416 |
| 10,136,543 | B1* | 11/2018 | Nadkarni | H05K 7/1427 |
| 10,592,019 | B2* | 3/2020 | Miyamoto | G06F 3/0416 |
| 2013/0321299 | A1* | 12/2013 | Kim | G06F 3/016 |
| | | | | 345/173 |
| 2014/0333564 | A1* | 11/2014 | Hong | G06F 3/041 |
| | | | | 345/173 |
| 2017/0220197 | A1* | 8/2017 | Matsumoto | G06F 3/016 |
| 2018/0052567 | A1* | 2/2018 | Miyamoto | G06F 3/01 |
| 2018/0275786 | A1* | 9/2018 | Miyamoto | G06F 3/016 |
| 2019/0073036 | A1* | 3/2019 | Bernstein | G06F 1/1662 |

\* cited by examiner

HAPTIC FEEDBACK DEVICE PROVIDED WITH STIFFENERS

FIELD OF THE INVENTION

The invention relates to haptic-feedback surfaces based on the principle of ultrasonic lubrication.

PRIOR ART

Haptic-feedback devices in which the propagation medium of the vibrations is a thin vibratable plate are known. A plate is said to be "thin" when it possesses a thickness that is small compared to its two other dimensions and compared to the wavelength of the vibratory waves in question.

As known, the plate may be monolithic or multi-layer and of rectangular shape. Electromechanical actuators are placed on the plate so as to excite an axial vibratory mode, i.e. one the vibrational nodes of which are aligned with respect to one another along a line parallel to one of the edges of the plate.

In a plate the thickness of which is no more than twice the wavelength of the vibration generated by the actuators, flexural waves referred to as A0 Lamb waves (or quasi-Lamb waves in the case of a multilayer plate that is asymmetric in thickness) are generated and are reflected from the two borders parallel to the line of alignment of the actuators.

When the actuation frequency is correctly adjusted, a stationary mode is excited that will act as an amplifier via a resonant effect. The large amplitudes of movement thus obtained at ultrasonic frequencies lead to the creation of a cushion of compressed air under the pulp of a user's finger (this effect being referred to as the squeeze-film effect). Since the finger is repulsed by the surface, the coefficient of friction is decreased and a haptic-feedback effect may thus be obtained when the finger is in motion. Ultrasonic lubrication is thus spoken of.

However, this approach has a drawback. Specifically, to obtain a haptic-feedback effect that is uniform over the entire surface it is crucial for the vibration of the plate to be as uniform as possible. However, when for example the (length-to-width) aspect ratio of the surface to be actuated approaches 1, two modes substantially at the same resonant frequency, one directed along the X-axis and the other along the Y-axis, superpose, this creating interference that disrupts the modal deformation. This effect decreases the efficacy of the actuation by the linear actuator array, because of the incompatibility between the position of the actuators and the waveform of the modal deformation. The actuators can no longer be actuated with a single signal, because they no longer vibrate in phase.

This degradation is also encountered with carriers of other shapes (other than square shapes): in fact it occurs whenever it is sought to obtain an axial mode of resonance with a line of actuators on a carrier other than a rectangular carrier (e.g. complex geometries combining curved edges and straight or non-parallel edges).

Other problems may add to the problems created by interference, such as problems due to focusing of the waves, which cause local over-intensities, and therefore a variability in the amplitude of vibration of the carrier, for example in carriers comprising concavities, and in an extreme case when the carrier is disk-shaped.

A touch device provided with a plate that is vibrated at an ultrasonic frequency by piezoelectric actuators, and the lower face of which has, at certain specific locations, a periodic structure formed from grooves or localized reductions in thickness, is known from document EP 3 287 880 A1. This periodic structure acts as a Bragg reflector allowing the standing waves to be confined to defined regions around the actuators, and in particular to regions of the plate that must be selectively vibrated in response to contact with a finger of a user. The objective of this structure is to limit power consumption as only actuators located in proximity to the regions touched by the user are made to vibrate.

The periodic structure described in this document therefore generates effects that are unlike those sought in the present invention, which aims to strongly excite a privileged axial mode (which is unidirectional, i.e. directed solely along X or along Y) over the whole of a haptic-feedback carrier of ultrasonic-lubrication type, with an amplitude that remains satisfactory whatever the shape of this carrier, i.e. whether it is rectangular, square, disk-shaped, or even any other shape.

AIM OF THE INVENTION

The general aim of the present invention is to provide a way of overcoming the limitations of the prior art, and in particular of obtaining an axial mode exhibiting a very uniform unidirectional vibration over the whole of the carrier, whatever the geometry and size of the surface to be actuated, so as to guarantee an optimal actuation over the entire carrier with a line of actuators.

SUMMARY OF THE INVENTION

The principle of the invention consists in modifying the structure of the surface of the carrier to be actuated in order to obtain a uniform vibration over the entire surface of the carrier. The carrier is initially isotropic, i.e. the ultrasound propagates at the same speed regardless of the direction. It is a question of making the carrier orthotropic, to force an axial resonant effect in one particular direction of the carrier independently of the geometry thereof (e.g. a square, a rectangle, or even a disk or any other shape).

This particular anisotropy or orthotropy of the surface to be actuated is obtained by providing one-dimensional stiffening elements, these being distributed over the whole of one face of the carrier, parallel to one another, whatever the geometry of the carrier. The actuators will then be placed in a line parallel or perpendicular to these stiffeners. Thus, on one face of the carrier, grooves are obtained that do not confine the vibrations to regions of the carrier, as proposed in the aforementioned document, but rather create effective, vibratory-wave propagation speeds that differ depending on whether the wave is propagating parallel or perpendicular to these grooves.

The actuators are placed in a line that is preferably parallel to the stiffeners, but that could also be perpendicular to the stiffeners.

Experiments have shown that this approach remains valid whatever the shape of the surface, although its practical application will mainly be to square or rectangular surfaces.

Therefore, the subject of the invention is a haptic-feedback device comprising a vibratable carrier a first face of which is coated with at least one layer incorporating a means for detecting the position of a finger of a user, said device comprising electromechanical actuators that are aligned on an edge of the carrier or of said layer and that are capable of making said carrier and said layer vibrate at an ultrasonic resonant frequency, characterized in that said carrier comprises, on its second face, a set of stiffeners that are distributed over the whole of this second face and that are configured to make it more difficult to bend the carrier about an axis perpendicular to the stiffeners, the stiffeners being placed to achieve an axial and uniform mode of vibration of the carrier, all the anti-nodes of which are of substantially equal amplitude.

According to one embodiment, the stiffeners are configured to obtain an axial mode of vibration the nodal lines of which are parallel to the alignment of the electromechanical actuators.

According to another embodiment, the stiffeners are configured to obtain an axial mode of vibration the nodal lines of which are perpendicular to the alignment of the electromechanical actuators.

According to one embodiment, the electromechanical actuators are placed in a line parallel or perpendicular to the stiffeners.

According to one embodiment, the carrier is made of metal, glass, ceramic, or a plastic in its vitreous phase.

According to one embodiment, said first face of said carrier is covered by a thin layer of a material (wood, plastic) exhibiting viscoelastic losses that are low enough not to compromise the ultrasonic resonance of said carrier.

According to an advantageous embodiment, at least one layer placed above the carrier incorporates a display device, in particular an OLED display, all of the layers of which are securely fastened to one another and capable of transmitting a vibration at an ultrasonic frequency.

According to various embodiments, the actuation frequency of the electromechanical actuators, which are piezoelectric ceramics for example, is an ultrasonic frequency comprised between 20 kHz and 200 kHz.

The stiffeners form parallel rectilinear grooves arranged on the carrier. They may be obtained in various ways from an industrial point of view. Thus they may in particular be machined directly in the carrier, or added and adhesively bonded to the same carrier. However, the carrier and its stiffeners may also be produced in a single operation by injection molding.

The stiffeners, as their name suggests, make it more difficult to bend the plate about an axis perpendicular to the stiffeners. This results in a difference in the propagation speed of the flexural wave in the case of ultrasonic vibration of the plate, since the flexural wave will propagate more slowly along an axis perpendicular to the stiffeners. Consequently, the stiffeners make it possible to avoid or to minimize the formation of destructive interference between the flexural waves resulting from the actuation of the plate, since they promote the emergence of a particular axial mode.

According to one embodiment optimized for a resonant frequency of the plate of 20 kHz, the plate has a thickness of 2 mm, and the stiffeners have a thickness of 1 mm and a width of 5 mm and are spaced apart by a distance of 5 mm.

According to one embodiment optimized for a resonant frequency of the plate of 200 kHz, the plate has a thickness of 2 mm, and the stiffeners have a thickness of 1 mm and a width of 1.2 mm and are spaced apart by a distance of 1.8 mm.

DETAILED DESCRIPTION

The invention will be described in more detail with reference to the figures, in which.

Figure 4A:
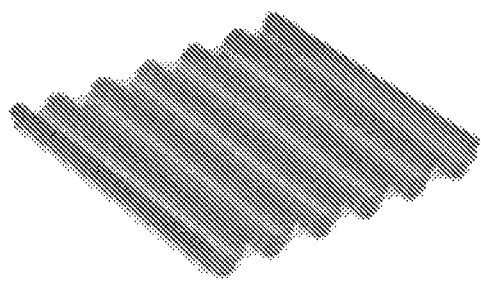
Figure 4B:
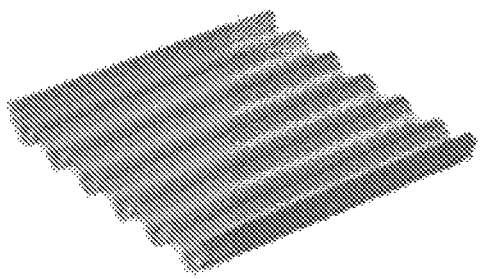
Figure 5:
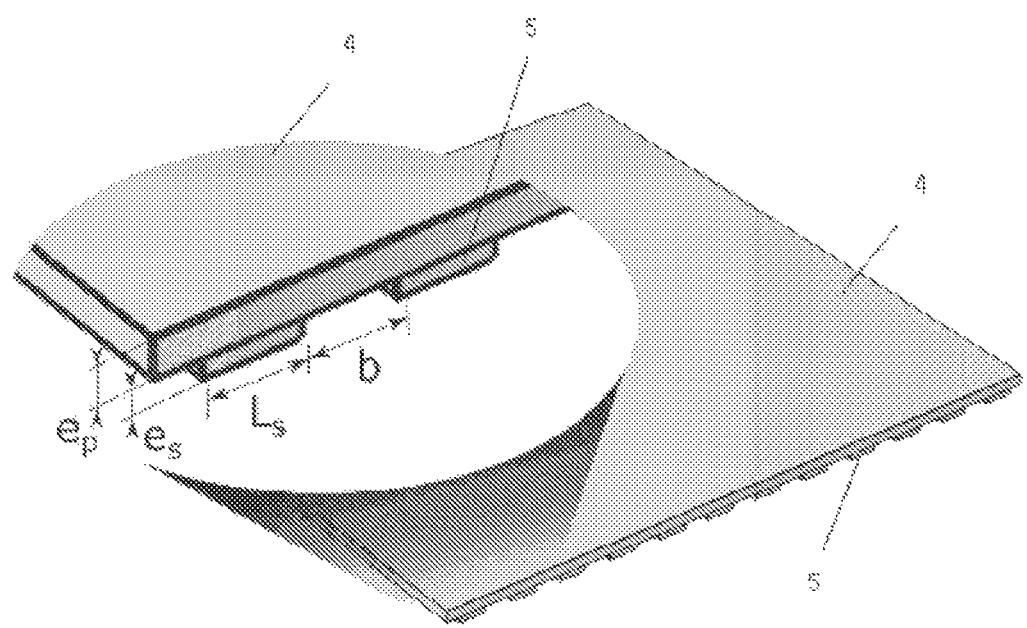
Figure 6:
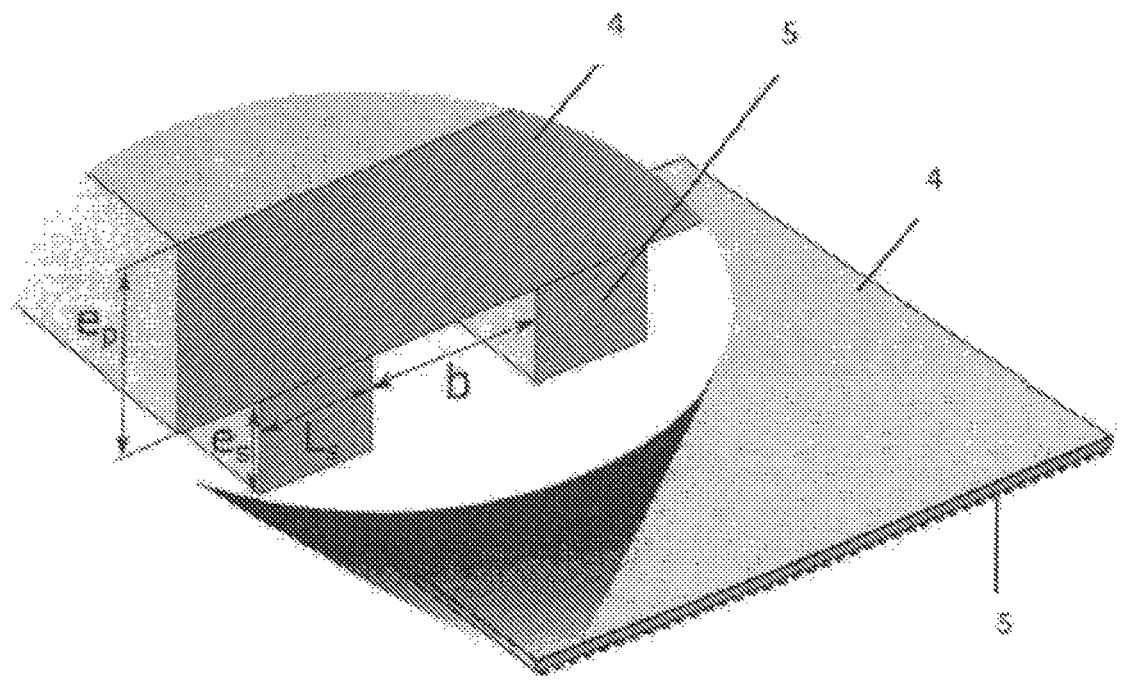
Figure 7:
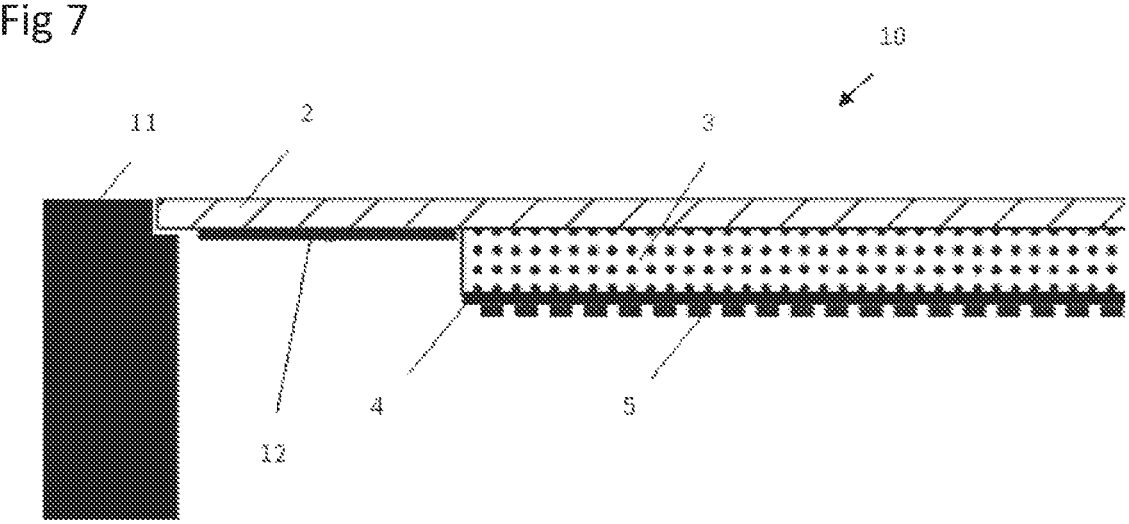

FIGS. 4(a) and 4(b) show the modal deformation of a square plate made of rigid material and provided with stiffeners according to the invention;

FIG. 5 shows a perspective view of one particular embodiment of the invention, which embodiment is tailored to an ultrasonic vibration frequency of 20 kHz;

FIG. 6 shows a perspective view of one particular embodiment of the invention, which embodiment is tailored to an ultrasonic vibration frequency of 200 kHz;

FIG. 7 shows a partial cross-sectional view of an OLED display incorporating, according to the invention, a vibratable carrier made of rigid material.

Figure 1:
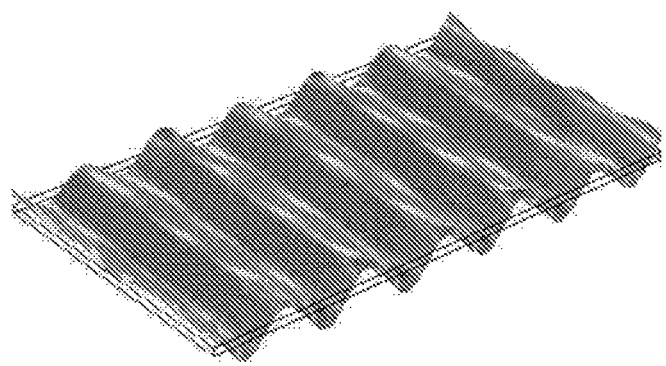
FIG. 1 shows the modal deformation of a rectangular plate made of purely elastic material at a natural frequency.

Reference will now be made to FIG. 1. When the (width-to-length) aspect ratio of a rectangular plate is small compared to 1, a so-called axial flexural mode of vibration, i.e. one having vibration nodes and anti-nodes parallel to one of the edges of the plate, may be obtained. This type of vibration is advantageous because it may be efficiently obtained with a set of electromechanical actuators placed in a line parallel to the vibration nodes. In the example shown, the plate has the following dimensions: 12 cm×7 cm×2 mm. It is excited by a normal force applied to all four corners. FIG. 1 corresponds to an excitation frequency of 42 kHz.

Figure 2:
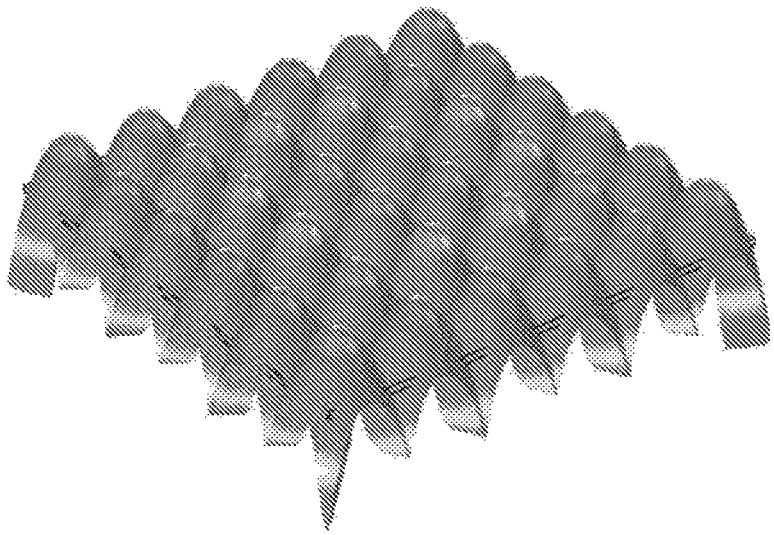
FIG. 2 shows, for a square plate made of a purely elastic material, the modal deformation corresponding to the interference between two axial modes in x and y that coexist at the same frequency.

FIG. 2 shows the vibratory response of a square plate measuring 12 cm×12 cm×2 mm with the same excitation as the rectangular plate of FIG. 1. This time, the spatial deformation is no longer oriented along an axis of the plate, circular vibration anti-nodes being obtained instead. In fact this corresponds to the superposition of 2 axial modes that are said to be degenerate because they are present at the same frequency (here 42318 Hz). In this case, this type of mode of vibration can no longer be effectively actuated with actuators arranged in a line.

Figure 3:
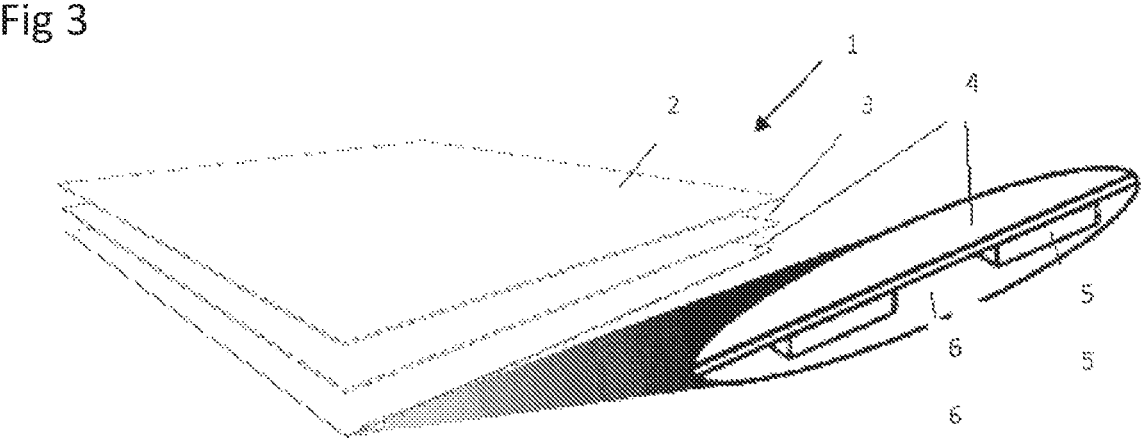
FIG. 3 shows a perspective view of a first embodiment of the invention.

FIG. 3 schematically shows the principle of the solution according to the invention: the device 1 comprises a number of layers 2, 3, 4. The plate 4 is a vibratable rigid plate (for example made of glass or metal) provided with piezoelectric actuators (not shown). Stiffeners 5 in relief have been added to the bottom face of the plate 4, i.e. to the face of the plate opposite the face bearing the upper layers 2, 3. In the example shown, the stiffeners 5 have a parallelepipedal shape, with a rectangular cross section, but other forms of cross section would be possible. With the spaces 6 between the stiffeners 5, grooves are obtained that allow an orthotropy to be created in the speed of propagation of the flexural waves, and in particular the speed of propagation of the A0 Lamb waves.

In the exemplary embodiment shown in FIG. 3, the device 1 has a composite structure. It comprises 3 superposed elements, namely for example an upper glass plate 2 (the coverglass), a set of polymer layers 3 forming an OLED display, and an aluminum plate 4 provided with stiffeners 5. The OLED display 3 itself comprises a plurality of layers, in a manner known per se. They are not shown or described in detail here.

In one possible variant embodiment, the upper layer 2 of the device 1 may optionally consist of a thin layer of a non-elastic and optionally opaque material (wood, plastic) generating viscoelastic losses that are low enough not to compromise the ultrasonic resonance of the carrier.

However, the invention is particularly useful when applied to a device 10 that incorporates an OLED display, as shown in cross section in FIG. 7. The OLED display 3 is integrated into a body 11. It has a coverglass 2 on its upper face. Under a lateral edge of the coverglass 2 and in alignment therewith are adhesively bonded piezoelectric actuators 12, which allow the assembly (2, 3) to be vibrated. As a variant, the actuators 12 could be adhesively bonded under the plate or carrier 4 so as to vibrate the assembly consisting of the plate 4 and the layers 2, 3. The actuators 12 are powered by a known control circuit (not shown). In a known manner, the coverglass 2 comprises a capacitive layer (not shown) allowing the device 10 to be made touch-sensitive, and the movement of the fingers of a user to be detected. A metal plate 4 is adhesively bonded to the lower face of the OLED display. The free lower face of the metal plate 4 is provided with stiffeners 5 in relief. They allow a user who touches a region of the of the display on its upper glass plate 2 to feel much better haptic feedback than that felt with a haptic-feedback display devoid of stiffeners.

This is corroborated by FIG. 4 in which the axial modes obtained after integration of stiffeners 5 into the bottom face of the plate 4 have been shown. The mode along one axis resonates at 43634 Hz whereas the mode along the perpendicular axis resonates at 53634 Hz. It may therefore be seen that the axial modes are now clearly separated in frequency. The anisotropy achieved via the stiffeners 5 causes a difference in propagation speed between the flexural waves that propagate along the x-axis and those that propagate along the y-axis of the plate. It will be understood that it is thus possible to actuate, with optimum efficiency, an axial mode in a square plate using a set of actuators aligned in a line parallel to one of the edges of the square plate, i.e. that it is possible to obtain larger plate vibratory amplitudes, uniformly over the surface of the plate, with however a lower energy expenditure.

This is due to the fact that the stiffeners make it more difficult for the plate to bend about an axis perpendicular to the stiffeners, this resulting, not in a localized confinement of the flexural waves, but in a difference in the speed of propagation of the flexural wave in the case of ultrasonic vibration of the plate.

The plate 4 on which the stiffeners 5 are arranged may itself be monolithic or multilayer. The stiffeners 5 have a cross section of any shape; however, to facilitate their manufacture, this shape will preferably be rectangular.

In practice, the stiffeners 5 may be produced by any useful means, for example by milling in a metal plate, or even by adding stiffeners that are then adhesively bonded to the bottom face of the plate 4.

To guarantee an optimization of the actuation, the stiffeners 5 of the plate 4 will be positioned at vibration anti-nodes, and the vibration of the assembly will be uniform.

FIG. 5 shows one particular embodiment, corresponding to a low point of the vibratory frequency of the actuators, namely 20 kHz, on a metal plate 4 of 2 mm thickness (ep). In this case, good results are obtained when the stiffeners 5 are dimensioned as follows:
 Thickness: es=2 mm
 Width: Ls=5 mm
 Spacing: b=5 mm
 Length: the length or width of the plate
FIG. 6 shows another particular embodiment, corresponding to a high point of the vibratory frequency of the actuators, namely 200 kHz, on a metal plate 4 of 2 mm thickness (ep). In this case, good results are obtained when the stiffeners 5 are dimensioned as follows:
 Thickness: es=1 mm
 Width: Ls=1.2 mm
 Spacing: b=1.8 mm
 Length: the length or width of the plate
Other optimum dimensions of the stiffeners will possibly be chosen for resonant-frequency values comprised between 20 kHz and 200 kHz.

Advantages of the Invention

The invention achieves the goals set.

In particular, it makes it possible, by virtue of the use of stiffeners, to obtain larger plate vibratory amplitudes, with however a lower energy expenditure.

The invention is ideally applicable to any product comprising a non-transparent layer allowing the stiffeners to be masked: switches, touch pads, optically bonded displays that may be excited from the bottom face of the display (OLED display).

It makes it possible to guarantee a uniform vibration over the surface of a vibratable rigid material, regardless of its shape, in order to obtain identical haptic feedback at all points of its surface.

The invention claimed is:
1. A haptic-feedback device comprising a vibratable plate a first face of which is coated with at least one layer incorporating a means for detecting the position of a finger of a user, said device comprising electromechanical actuators that are aligned on an edge of the plate or of the layer and that are capable of making said plate and said layer vibrate at an ultrasonic resonant frequency, wherein said plate comprises, on its second face, a set of stiffeners parallel to each other and distributed over the whole of said second face, said stiffeners protruding over said second face and being placed to make it more difficult to bend the plate about an axis perpendicular to the stiffeners in order to achieve an axial and uniform mode of vibration of the plate, said stiffeners having a thickness in relief with respect to said plate, a width, and a distance by which the stiffeners are spaced apart selected such that a flexural wave that propagates along an axis perpendicular to the stiffeners propagates more slowly than a flexural wave that propagates along an axis parallel to the stiffeners, and such that localized confinement of the flexural waves is avoided.

2. The device as claimed in claim 1, wherein said electromechanical actuators are arranged along a line parallel or perpendicular to the stiffeners, so as to obtain an axial mode of vibration the nodal lines of which are parallel to the alignment of the electromechanical actuators.

3. The device as claimed in claim 1, wherein said plate is made of metal, glass, ceramic, or a plastic in its vitreous phase.

4. The device as claimed in claim 1, wherein said first face of said plate is covered by a thin layer of a material exhibiting viscoelastic losses that are low enough not to compromise the ultrasonic resonance of said plate.

5. The device as claimed in claim 1, wherein the at least one layer is placed above said plate and incorporates a display device all of the layers of which are securely fastened to each other and able to transmit a vibration at an ultrasonic frequency.

6. The device as claimed in claim 5, wherein said display device is an OLED display.

7. The device as claimed in claim 1, wherein the actuation frequency of the electromechanical actuators is an ultrasonic frequency comprised between 20 kHz and 200 kHz.

8. The device as claimed in claim 1, wherein the sitffeners are obtained by machining the plate so as to leave stiffeners in relief with respect to said second face of the plate.

9. The device as claimed in claim 1, wherein the stiffeners are added and adhesively bonded to said second face of said plate.

10. The device as claimed in claim 1, wherein said plate and its stiffeners are produced by injection molding.

11. The device as claimed in claim 1, said device being optimized for a resonant frequency of 20 kHz of the plate, wherein said plate has a thickness of 2 mm, and wherein the thickness in relief with respect to said plate of the stiffeners is 2 mm, the width of the stiffeners is 5 mm, and the distance by which the stiffeners are spaced apart is 5 mm.

12. The device as claimed in claim 1, said device being optimized for a resonant frequency of 200 kHz of the plate, wherein said plate has a thickness of 2 mm, and wherein the thickness in relief with respect to said plate of the stiffeners is 1 mm, the width of the stiffeners is 1.2 mm, and the distance by which the stiffeners are spaced apart is 1.8 mm.

13. The device as claimed in claim 4, wherein said material exhibiting viscoelastic losses that are low enough not to compromise the ultrasonic resonance of said plate is wood or plastic.

* * * * *